Feb. 8, 1927.
B. BORDEN
1,616,649
PIPE THREADING MACHINE
Filed June 5, 1924
2 Sheets-Sheet 1
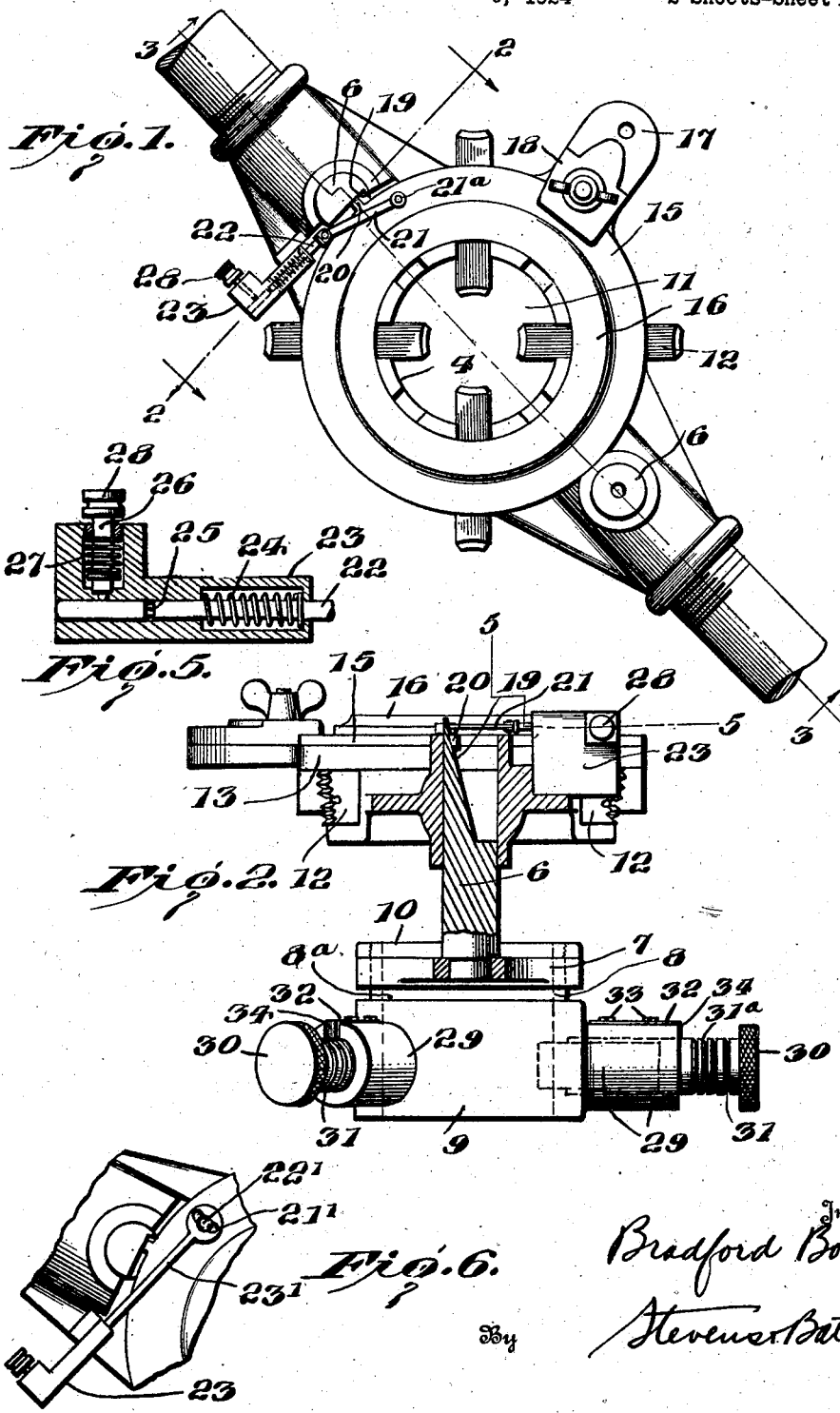
Inventor
Bradford Borden
By Stevens Batchelor
Attorneys

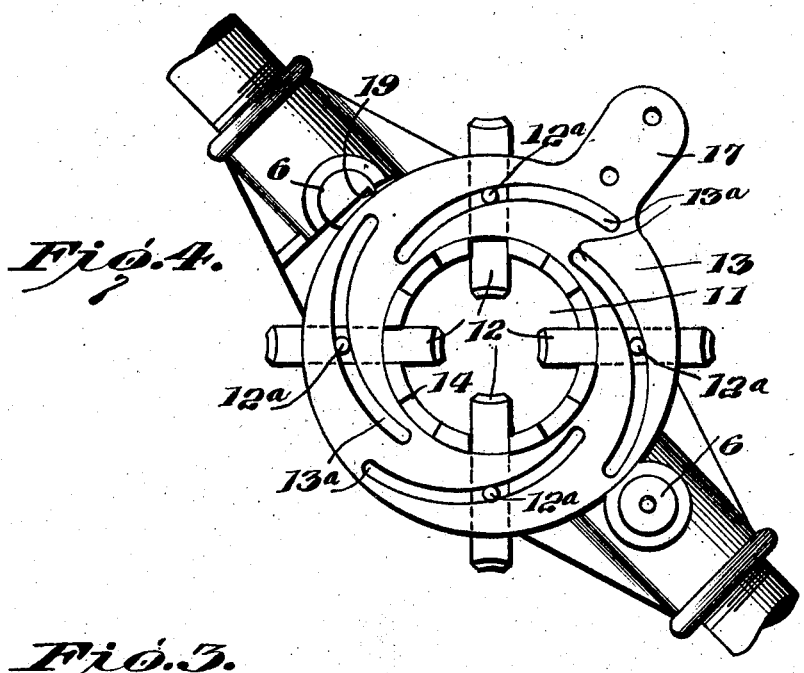
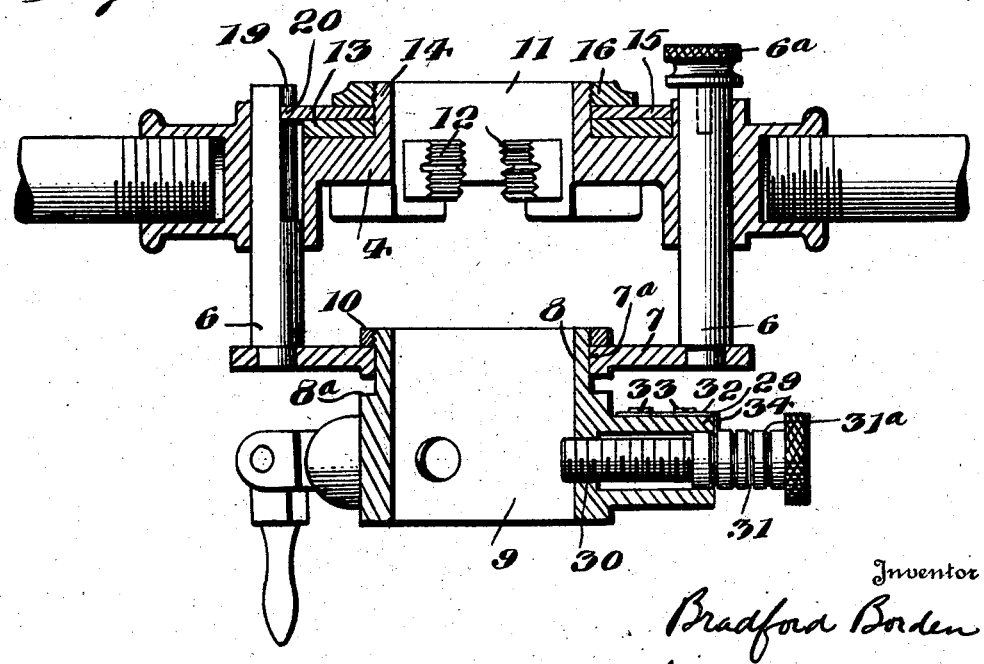

Patented Feb. 8, 1927.

1,616,649

UNITED STATES PATENT OFFICE.

BRADFORD BORDEN, OF CLEVELAND, OHIO.

PIPE-THREADING MACHINE.

Application filed June 5, 1924. Serial No. 718,090.

My present invention is designed particularly for application to thread-cutting tools of the type including a die stock having a plurality of thread cutting dies, the movement of which is controlled by means of cam connections with a rotatable plate, but it is to be understood that the invention is susceptible of adaptation to other types of thread cutting tools.

As is well known to those versed in the art to which this invention appertains, it is frequently necessary during the operation of cutting a thread upon a pipe or other work to withdraw the dies or other thread cutting elements therefrom and re-start them upon the work in order to cut a deeper thread. This withdrawing and re-starting of the dies of the prior art is attended with considerable difficulty, particularly in the type of thread cutting tool which includes a leader screw for controlling the axial movement of the die stock. In this class of tools it is necessary to rotate the die stock in a reverse direction, back threading the dies until the end of the work is reached. Another difficulty with well known tools of this character is that the dies cannot be withdrawn from the work without destroying the adjustment of the same with respect to the work, all of which results in considerable loss of time and efficiency. It is, therefore, the primary object of this invention to provide a thread cutting tool, the dies or other thread cutting elements of which may be expeditiously disengaged from the work at any stage of the threading operation and quickly removed to starting position without the necessity of loosening clamps or other fastening members and at the same time avoiding a disturbance of the adjustment of the dies with respect to the work.

The invention further contemplates the provision of a thread cutting tool in which the necessity for a leader screw is obviated, and which is adapted for the cutting of either straight or tapered threads, or both, in a single operation upon work of varying dimensions.

The invention has for a further object to furnish a tool of this kind which will be simple and durable in construction, easily assembled, and highly efficient in practical use.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described what I now regard as the preferred embodiment of my invention.

In the drawings,

Figure 1 is a plan view of a thread cutting tool to which my improvement has been applied;

Fig. 2 is a sectional view taken on the line 2—2 of Fig. 1;

Fig. 3 is a central vertical section taken on the line 3—3 of Fig. 1;

Fig. 4 is a view similar to Fig. 1 with certain parts removed to illustrate the controlling means for the dies;

Fig. 5 is a sectional detail on the line 5—5 of Fig. 2, and

Fig. 6 is a detail, in plan, of a slightly modified construction.

Referring specifically to the drawings, wherein like reference characters have been used to designate similar parts in all views, numeral 4 denotes the die stock housing, the same being slidably supported by diametrically opposite posts 6 rising from a base plate 7 having a central opening 7$^a$, this plate 7 being rotatably supported by means of a tubular extension 8 of a work holder 9. A ring 10 threaded upon the extremity of the extension 8 serves to prevent displacement of the plate 7 and it should here be noted that said plate is capable of limited axial movement between the ring 10 and a shoulder 8$^a$ which characteristic is of considerable importance since it facilitates starting of the dies upon the work in a manner to be described in detail hereinafter.

The die stock housing, per se, is of known construction, having the usual work receiving bore 11 concentric with the medial opening 7$^a$ of the plate 7, and being provided with radial slots communicating with said bore and adapted to receive dies 12. One longitudinal edge of each die is provided with a lug 12$^a$, which lugs of the respective dies are receivable within arcuate cam-like slots 13$^a$ of a plate 13 which is provided with a central opening and is rotatable about a sleeve-like extension 14 of the die stock housing as shown in Fig. 3. This plate 13 is supported by the said housing and surmounted by an independently rotatable plate 15 which likewise has a central opening for the reception of the housing neck 14. A nut 16 threaded upon the outer extremity of the neck 14 prevents removal of the plates 13 and 15.

The relative position of the dies or chasers 12 with respect to the work to be threaded is controlled in a familiar manner by movement of the plate 13 by means of the handle 17, or otherwise, the handle being provided with a clamp 18 whereby the same may be locked to the plate 15 after the dies or chasers have been satisfactorily adjusted.

The usual sleeve-like bearing portions are provided for slidably receiving the posts 6, and one of these posts has its inner face cut away to define an obliquely disposed rib or shoulder 19 which is adapted to cooperate with a projection 20 carried by said plate 15 for gradually turning the latter as the die stock housing 4 moves in the direction of the ring 7 during its normal clockwise rotation for progressively withdrawing the dies or chasers 12 from the work to form a tapered thread thereon.

In order to assure the maintenance of the projection 20 in frictional engagement with the oblique shoulder 19 at all times I have provided upon said plate 15 a link 21 which is pivoted to a pin 21$^a$ carried by said plate. The other end of this link has a pivotal connection with a plunger 22 slidable within a housing 23 carried by the die stock housing 4 which plunger is normally urged outwardly by means of a spring 24.

Assuming that a section of pipe or other work has been partially threaded and it is desired to re-start the dies thereon, it will be noted that with my improvement the handle 17 controlling the movement of the slotted plate 13 may be rotated in a counterclockwise direction carrying with it the plate 15 for withdrawing the dies 12 from the work. The diagonal post shoulder 19 combined with the projection 20, spring pressed plunger 22 and link 21 is of manifest importance aside from the fact that it permits disengagement of the dies from the work at any stage of the thread cutting operation. Where a diagonal post groove is employed as in the prior art (my Patent No. 1,102,713, of July 7, 1914, for instance) there would of necessity be slight play in the groove to permit the lug 20 to slide. In actual operation of the tool the projection would partake slightly of a racing movement when the tool is stopped momentarily at the completion of a turn and would move from the active wall and bind against the inactive wall of the groove. This movement of the lug of the die controlling plate, slight though it may appear, is conveyed to the dies and results in the cutting of an imperfect thread,—that is, one of ununiform depth, also an imperfect taper is produced. In my present construction spring pressed plunger 22 holds projection 20 against shoulder 19 at all times. In order to maintain the dies out of engagement with the work for such a period as may be necessary to move the die stock housing to starting position, I have provided a circumferential groove 25 in the plunger 22 which is designed to receive the end of a second plunger 26 carried by said housing 23 and tensioned against said first-mentioned plunger by means of a spring 27. When it is desired to release the plunger 22 it is only necessary to grasp the thumb piece 28 of the plunger 26 to withdraw its end from the groove 25.

In Fig. 6, the modified construction there illustrated comprehends a plunger 23' in connection with said housing 23 which is provided with a disk-like enlargement at one end having an arcuate slot 21' therein in which works a pin 22' carried by the plate 15. This arcuate slot 21' compensates for the rotating movement of the plate 15 and does away with the necessity of the link 21 of Fig. 1.

Another feature of my improvement in thread cutting tools which as yet has not been described is shown in Fig. 2, wherein it will be noted that the upper portion of the work holder 9 is provided with a number of radially projecting bosses 29 which are internally threaded for reception of screws or pins 30, the inner ends of which are designed to be projected against the work for properly centering the same with respect to the dies 12, the work, of course, being gripped by any suitable form of gripping device, the nature of which is immaterial to this invention. The screws 30, as will be noted, are unthreaded in proximity to their outer ends but are formed with a plurality of spaced circumferential grooves 31, the walls of which adjacent the work engaging ends of the screws being beveled as indicated at 31$^a$. Upon each of the bosses 29 is secured a leaf spring 32 by means of screws 33, a laterally projecting portion 34 of each leaf spring being engageable with the grooves 31 for the purpose of preventing advancement of the same in the direction of the work except upon manual disengagement of said ends from the grooves. It will be appreciated, however, that the screws 30 may be retracted without raising the lateral ends 34 of the springs, since the latter will ride out of the grooves due to the beveled formation of the inner walls thereof. It will thus be seen that a quick and positive adjusting means has been provided for properly centering the work.

The operation of the tool may be summarized as follows:

The pipe or other work to be threaded will for said dies movable with and relatively of said diestock, and slidably supporting said diestock, and having a longitudinally extending shoulder formed thereon, a lug projecting from said controlling member and engaging said shoulder in the sliding movement of said diestock, and means carried by said diestock and yieldingly engaging said controlling member to maintain the lug thereof in engagement with said shoulder.

4. In a thread cutting tool, a diestock, dies carried thereby, a controlling member for said dies movable with and relatively of said diestock, posts slidably supporting said diestock, one of said posts having a flat face and a diagonal longitudinally extending shoulder formed thereon, a lug projecting from said controlling member and engaging said shoulder in the sliding movement of said diestock for effecting movement of said controlling member relatively of said diestock to gradually recede the dies from the work to produce a tapered thread therein, and said controlling member being freely movable to disengage said lug from the shoulder and the dies from the work at any stage of the threading operation.

5. In a thread cutting tool, a diestock, dies carried thereby, a controlling member for said dies movable with and relatively of said diestock, guide means slidably supporting said diestock, abutments carried by said guide means and said controlling member for limiting relative movement of the latter in a direction contra to the direction of rotation of said diestock in the threading operation, one of said abutments being arranged diagonally with respect to the axis of the work whereby to accelerate the movement of said controlling member in the direction of rotation of the diestock in the threading operation to recede the dies from the work, said controlling member being manually movable at any stage of the thread cutting operation to disengage said abutments and to withdraw the dies from the work, and yielding means, engaging said diestock and controlling member for urging the latter in a direction contra to the rotation of said diestock in cutting threads to prevent accidental relative or racing movement of said member to disengage the dies from the work.

6. In a thread cutting tool, a rotatable diestock having a plurality of movable thread cutting members, a controlling member therefor rotatable relatively of and about an axis parallel to the axis of said diestock, means for engaging and effecting rotation of said controlling member with said diestock during the threading operation and yielding means for holding said first-mentioned means and controlling member in cooperative relation to prevent racing of the latter during the threading operation to retract the dies from the work.

7. The combination with a thread cutting tool comprising a die stock, movable dies carried thereby and a controlling member movable relatively of said die stock for actuating said dies to and from engagement with the work, of a rigid instrumentality arranged to sustain said controlling member which is forced thereagainst by the back thrust of the dies in the thread cutting operation, said instrumentality being further arranged to actuate said controlling member to gradually recede the dies from the work in the thread cutting operation, yielding means for normally restraining said controlling member against accidental movement to disengage itself from said instrumentality and the dies from the work, and manual means operable at any stage of the threading operation for actuating said controlling member against said yielding means to disengage the dies from the work.

8. The combination with a thread cutting tool comprising a die stock, dies carried thereby, means for adjusting said dies, and a controlling member movable relatively of said die stock for actuating the adjusted dies to and from engagement with the work; of movable means for normally restraining said controlling member against accidental movement to disengage the dies from the work, said controlling member being manually movable at any stage of the threading operation without disturbing the adjustment of the dies to displace said movable means and disengage the dies from the work, and latch means for retaining said controlling member in a position in which the dies will be out of engagement with the work.

9. The combination with a thread cutting tool comprising a die stock, movable dies carried thereby and a controlling member movable relatively of said die stock for actuating said dies to and from engagement with the work, of an instrumentality arranged to sustain and actuate said controlling member to gradually recede the dies from the work in the thread cutting operation, yielding means for normally restraining said controlling member against accidental movement to disengage the dies from the work, and latch means acting through said yielding means to retain said controlling member in a position to hold the dies out of engagement with the work.

10. The combination with a die stock, the dies, a relatively movable controlling member therefor, and means for actuating said controlling member during the thread cutting operation to gradually recede the dies from the work; of a spring pressed member carried by said die stock and having a pivotal connection with said controlling member for yieldably restraining the same against accidental movement to disengage the dies from the work during the threading be suitably engaged with the tool by means of a work holder and the screws 30 will be adjusted to properly center the pipe with respect to the dies. It is to be understood that the end of the work to be threaded will be so located as to be engaged by the lowermost sets of die teeth with the die stock housing 4 at the limit of its upward travel.

It should here be noted that the dies 12 are of the double-ended type having two sets of obliquely disposed teeth as described in my co-pending application, Serial No. 705,298, filed April 9th, 1924. It is to be understood that the plates 13 and 15 will be suitably clamped together so as to attain a desired adjustment of the dies with respect to the work. Rotary movement is imparted to the die stock housing 4 by means of the usual handles, the teeth of the dies being caused to bite into the work and move gradually onto the same in the direction of the gripping device or support 9. The threads initially cut will be straight since it will be remembered that the plate 7 carrying the posts is capable of limited axial sliding movement between the ring 10 and the shoulder 8ª. However, as soon as the plate 7 is stopped by the shoulder 8ª continued rotation of the die stock housing 4 will result in a movement of the same in the direction of the plate 7, sliding on the posts 6. This sliding movement of the die stock housing resulting from the progressive threading of the work causes limited rotation of the plates 13 and 15 by reason of the camming action of the oblique post shoulder 19 against the projection 20 of the plate 15, and, as previously intimated, such rotary movement of the plate 13 through the action of its cam slots 13ª upon the studs 12ª of the dies causes a receding of the same from the work to produce a gradual outward taper of the threads to assure the proper binding of a nut thereon. If after a partial threading of the work it is seen that the thread is of insufficient depth it is only necessary in order to restart the dies to move the handle 17 of the plate 13 in a counter-clockwise direction until the groove 25 of the plunger 22 is engaged by the end of the pin 26. Now the die stock 4 may be elevated to starting position and the assembled plates 13 and 15 rotated in a clockwise direction by means of the spring-pressed plunger 22 by merely raising the pin 24.

If it is desired to cut a tapered thread, only, it will be obvious that the dies will be engaged with the work as previously described except that the plate 7 and die stock 4 will not be at the limit of their upward movement. Here the plate in its initial position will be supported by the shoulder 8ª of the upper portion of the gripping device 9. Should straight threads be desired, this may be produced by first engaging the end of the spring pressed pin or plunger 26 in groove 25 to hold projection 20 clear of the diagonal post shoulder 19, and then loosening clamp 18 so that cam plate 13 can be moved to set the dies for the size of work to be threaded. After the dies 12 have been set, clamp 18 is tightened to hold plates 13 and 15 together as a unit. In the threading operation the engagement of the pin or plunger 26 in groove 25 of the plunger 22 prevents relative movement of the plates 13, 15 with respect to the diestock. From the foregoing it will be clear that the dies are held in a fixed position to cut a straight thread,—it being further evident that upon the disengaging of pin 26 from groove 25, handle 17 may be moved counter clockwise as before against the tension of spring 24 to disengage the die teeth from the work at any stage of the thread cutting operation.

The preferred embodiment of my invention has been illustrated in accordance with the patent statutes, but it will be distinctly understood that I do not propose to limit myself strictly thereto, since various changes and modifications may be made in the illustrated embodiment of the invention without a departure of the spirit and scope of the following claims.

I claim:

1. In a pipe threading tool, a diestock, dies carried thereby, a controlling member for said dies movable with and relatively of said diestock, means slidably supporting said diestock, and having a longitudinally extending shoulder formed thereon, a lug projecting from said controlling member and engaging said shoulder in the sliding movement of said diestock, a boss formed upon said diestock, a spring pressed plunger working in said boss and having a pivotal connection with said controlling member for normally tending to maintain the lug thereof in engagement with said shoulder, and a latch carried by said boss and engaging said puunger against the tension of its spring to maintain said controlling member in a position wherein the dies will be out of engagement with the work.

2. In a thread cutting tool, a diestock, dies carried thereby, a controlling member for said dies movable with and relatively of said diestock, posts slidably supporting said diestock, one of said posts having a longitudinally extending shoulder formed thereon, a lug projecting from said controlling member and engaging said shoulder in the sliding movement of said diestock, a boss formed upon said diestock, and a spring pressed plunger working in said boss and engaging said controlling member for normally tending to maintain the lug thereof in engagement with said shoulder.

3. In a thread cutting tool, a diestock, dies carried thereby, a controlling member operation, said controlling member being manually movable against said spring pressed member to disengage the dies from the work at any stage of the thread cutting operation, and latch means engaging said spring pressed member for retaining said controlling member in a position in which the dies will be clear of the work.

11. The combination with a die stock, the dies, and a relatively movable controlling member therefor; of a transversely movable member carried by said die stock and having a pivotal connection with said controlling member to normally restrain the same against accidental movement to disengage the dies from the work in the thread cutting operation, said controlling member being manually operable against said movable member to disengage the dies from the work at any stage of the thread cutting operation.

12. In combination with a die stock, the dies, and a relatively movable controlling member therefor; of a transversely slidable member having a pivotal connection with said controlling member, a boss formed upon said die stock for receiving said slidable member, and means cooperating with said slidable member to retain the controlling member in a position to hold the dies in contact with the work.

13. In combination with a die stock, the dies, and a relatively movable controlling member therefor; of a slidable member having a pivotal connection with said controlling member, a boss formed upon said die stock for receiving said slidable member, means cooperating with said slidable member to retain the controlling member in a position to hold the dies in contact with the work, and a latch carried by said boss and engaging said slidable member when the same is retracted in the boss to retain said controlling member in a position to hold the dies out of engagement with the work.

14. The combination with a thread cutting tool comprising a diestock, movable dies carried thereby and a controlling member movable relatively of said diestock for actuating said dies to and from engagement with the work; of an instrumentality against which the controlling member is forced by the back thrust from the dies when in use and which is arranged to sustain said controlling member in the thread cutting operation, and yielding means for normally restraining said controlling member against accidental racing movement to disengage itself from said instrumentality and retract the dies from the work.

15. A diestock, dies carried thereby, means for sustaining the dies in the thread cutting operation and including a fixed and a movable element, said movable element having an operative connection with the dies and being forced by the back thrust of the dies in the thread cutting operation to engage said fixed element, and yielding means engaging said movable element, said yielding means being of sufficient strength to maintain said fixed and movable elements in cooperative engagement during the thread cutting operation both during the intermittent turning of the diestock and during the intervening periods between said turns whereby a uniform depth of thread will be cut in the work.

16. A diestock, dies carried thereby, means for sustaining the dies in the thread cutting operation and including a fixed and a movable element, said movable element having an operative connection with the dies and being forced by the back thrust of the dies in the thread cutting operation to engage said fixed element, yielding means engaging said movable element, said yielding means being of sufficient strength to maintain said fixed and movable elements in cooperative engagement during the thread cutting operation both during the intermittent turning of the diestock and during the intervening periods between said turns whereby a uniform depth of threads will be cut in the work, and said movable element being manually movable against said yielding means whereby to permit disengagement of the dies from the work at any stage of the thread cutting operation.

17. In a diestock, dies carried thereby, means for adjusting the dies for variously sized work, means for actuating the adjusted dies to engage the work, sustaining means for holding said die actuating means stationary in the thread cutting operation whereby to produce a straight thread, a second sustaining means for said die actuating means for actuating the same to gradually retract the dies from the work in the thread cutting operation to produce a tapered thread, said die actuating means being manually movable at any stage of the thread cutting operation to disengage the same from either of sustaining means.

18. In a diestock, adjustable dies carried thereby, means for progressively receding the dies from the work in the thread cutting operation to produce a tapered thread, said means including a movable die controlling element and a fixed diagonal shoulder with which it engages, and latch means engaging said movable element for locking the dies in a fixed position for cutting a straight thread.

19. In a diestock, dies carried thereby, means for progressively receding the dies from the work in the thread cutting operation to produce a tapered thread, said means comprising a fixed element and a movable die controlling element, said fixed element acting through said movable die controlling element to sustain the back thrust of the dies in the thread cutting operation, and means normally holding said elements in cooperative engagement and permitting manual actuation of said movable element to retract the dies from the work at any stage of the thread cutting operation.

20. In a diestock, dies carried thereby, means for progressively receding the dies from the work in the thread cutting operation to produce a tapered thread, said means comprising a fixed element and a movable die controlling element, means normally holding said elements in cooperative engagement and permitting manual actuation of said movable element to retract the dies from the work at any stage of the thread cutting operation, and retaining means for holding said movable die controlling element out of engagement with said fixed element whereby to hold the dies in a fixed position to cut a straight thread.

21. In a diestock, dies carried thereby, means for progressively receding the dies from the work in the thread cutting operation to produce a tapered thread, said means comprising a fixed element and a movable die controlling element, means normally holding said elements in cooperative engagement and permitting manual actuation of said movable element to retract the dies from the work at any stage of the thread cutting operation, retaining means for holding said movable die controlling element out of engagement with said fixed element whereby to hold the dies in a fixed position to cut a straight thread, and said movable die controlling element upon release of said retaining means being manually movable to disengage the dies from the work.

22. In a diestock, dies carried thereby, controlling means for the dies, actuating means for effecting movement of said controlling means to gradually retract the dies as the thread cutting operation progresses whereby to produce a tapered thread, said actuating means comprising cooperating fixed and movable elements, yielding means normally engaging said movable element to maintain a cooperative engagement between said elements in the thread cutting operation, and a latch for holding said movable element in a fixed position out of cooperative engagement with said fixed element whereby to hold said dies against movement in the thread cutting operation to cut a straight thread and said movable element on release of said latch being manually movable to completely disengaged the dies from the work.

In testimony whereof I have signed this specification.

BRADFORD BORDEN.